United States Patent
Perugini et al.

(10) Patent No.: US 6,611,865 B1
(45) Date of Patent: *Aug. 26, 2003

(54) METHOD AND APPARATUS FOR EXPORTING DIAGNOSTICS INTERFACE AND MENU SYSTEM TO ALLOW REMOTE EXECUTION

(75) Inventors: Robert Perugini, Tomball, TX (US); John S. Harsany, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/303,119

(22) Filed: Apr. 30, 1999

(51) Int. Cl.[7] ................. G06F 15/16; G06F 15/173; G06F 11/30
(52) U.S. Cl. ............. 709/224; 709/223; 709/227; 714/25; 714/32
(58) Field of Search ............... 709/223, 224, 709/227; 714/32, 25

(56) References Cited

U.S. PATENT DOCUMENTS

| | | | | |
|---|---|---|---|---|
| 5,367,667 A | * | 11/1994 | Wahlquist et al. | 714/32 |
| 5,491,796 A | * | 2/1996 | Wanderer et al. | 709/224 |
| 5,790,977 A | * | 8/1998 | Ezekiel | 702/122 |
| 5,796,953 A | * | 8/1998 | Zey | 709/227 |
| 5,896,494 A | * | 4/1999 | Perugini et al. | 714/27 |
| 6,278,694 B1 | * | 8/2001 | Wolf et al. | 370/253 |
| 6,434,572 B2 | * | 8/2002 | Derzay et al. | 707/104.1 |
| 6,434,615 B1 | * | 8/2002 | Dinh et al. | 709/224 |

OTHER PUBLICATIONS

TCP/IP Specification, Microsoft Developer Network, Jul. 1998.

* cited by examiner

Primary Examiner—Kenneth R. Coulter
Assistant Examiner—Paul Kang

(57) ABSTRACT

The present invention provides for a method and an apparatus for performing remote execution of system administration upon a standalone computer system, using a controlling computer system. A remote communication sequence is initiated. Communications between the controlling computer system and the standalone computer system is established using the remote communication sequence. Furthermore, a diagnostic software application is initiated on the standalone computer system using the established communication between the controlling computer system and the standalone computer system.

37 Claims, 13 Drawing Sheets

```
ip: ==============INTERNET PROTOCOL===============
    STATION:172.18.216.111 ----> 255.255.255.255
    PROTOCOL: UDP
    VERSION: 4
    HEADER LENGTH (32 BIT WORDS): 5
    PRECEDENCE: ROUTINE
    NORMAL DELAY, NORMAL THROUGHPUT, NORMAL RELIABILITY
    TOTAL LENGTH: 61
    IDENTIFICATION: 40325
    FRAGMENTATION ALLOWED, LAST FRAGMENT
    FRAGMENT OFFSET: 0
    TIME TO LIVE: 128 SECONDS
    CHECKSUM: 0x18A9(VALID)
udp:=============USER DATAGRAM PROTOCOL============
    SOURCE PORT: 65212
    DESTINATION PORT: 65212
    LENGTH = 41
    CHECKSUM: 0x412D(VALID)
DATA:
 0: 4A 4D 65 79 65 72 28 52 49 56 45 4E 44 45 4C 4C | JMEYER(RIVENDELL
10: 5F 4E 54 29 3A 44 46 57 20 53 65 72 76 65 72 73 | _NT) :DFW SERVERS
20: 3D                                              | =
```

*FIG.6a*

```
ip: ===============INTERNET PROTOCOL==============
    STATION:172.18.216.121 ----> 172.18.216.111
    PROTOCOL: TCP
    VERSION: 4
    HEADER LENGTH (32 BIT WORDS): 5
    PRECEDENCE: ROUTINE
    NORMAL DELAY, NORMAL THROUGHPUT, NORMAL RELIABILITY
    TOTAL LENGTH: 83
    IDENTIFICATION: 38089
    FRAGMENTATION NOT ALLOWED, LAST FRAGMENT
    FRAGMENT OFFSET: 0
    TIME TO LIVE: 32 SECONDS
    CHECKSUM: 0xBCCD(VALID)
tcp:==========TRANSMISSION CONTROL PROTOCOL==========
    SOURCE PORT: 22304
    DESTINATION PORT: 65213
    SEQUENCE NUMBER: 1639372525
    ACKNOWLEDGEMENT NUMBER: 686092143
    DATA OFFSET (32-BIT WORDS) 5
    WINDOW: 8760
    CONTROL BITS: 24
    CHECKSUM: 0xD7B9(VALID)
    URGENT POINTER: 0
DATA:
 0: 4A 4D 65 79 65 72 28 54 45 53 54 53 54 41 54 49 | JMEYER(TESTSTATI
10: 4F 4E 29 3A 44 46 57 20 53 65 72 76 65 72 73 3D | ON) DFW SERVERS=
20: 54 45 53 54 53 54 41 54 49 4F 4E                | TESTSTATION
```

*FIG.6b* ip: = = = = = = = = = = = = INTERNET PROTOCOL = = = = = = = = = = = =
    STATION:172.18.216.111 ----> 172.18.216.121
    PROTOCOL: TCP
    VERSION: 4
    HEADER LENGTH (32 BIT WORDS): 5
    PRECEDENCE: ROUTINE
    NORMAL DELAY, NORMAL THROUGHPUT, NORMAL RELIABILITY
    TOTAL LENGTH: 64
    IDENTIFICATION: 40837
    FRAGMENTATION NOT ALLOWED, LAST FRAGMENT
    FRAGMENT OFFSET: 0
    TIME TO LIVE: 128 SECONDS
    CHECKSUM: 0x5224(VALID)

tcp: = = = = = = = = = = TRANSMISSION CONTROL PROTOCOL = = = =
    SOURCE PORT: 65213
    DESTINATION PORT: 22304
    SEQUENCE NUMBER: 686092143
    ACKNOWLEDGEMENT NUMBER: 1639372568
    DATA OFFSET (32-BIT WORDS): 5
    WINDOW: 8717
    CONTROL BITS: 24
    CHECKSUM: 0x2FB2(VALID)
    URGENT POINTER: 0

DATA:
 0: 4A 4D 65 79 65 72 28 52 49 56 45 4E 44 45 4C 4C  | JMEYER(RIVENDELL
10: 5F 4E 54 29 3A 41 63 6B                          | _NT) ACK

FIG.6c ip: = = = = = = = = = = = = = INTERNET PROTOCOL = = = = = = = = = = = = =
    STATION:172.18.216.111 ----> 172.18.216.121
    PROTOCOL: TCP
    VERSION: 4
    HEADER LENGTH (32 BIT WORDS): 5
    PRECEDENCE: ROUTINE
    NORMAL DELAY, NORMAL THROUGHPUT, NORMAL RELIABILITY
    TOTAL LENGTH: 113
    IDENTIFICATION: 49797
    FRAGMENTATION NOT ALLOWED, LAST FRAGMENT
    FRAGMENT OFFSET: 0
    TIME TO LIVE: 128 SECONDS
    CHECKSUM: 0x2EF3(VALID)

tcp: = = = = = = = = = = = TRANSMISSION CONTROL PROTOCOL = = = = =
    SOURCE PORT: 1251
    DESTINATION PORT: 65213
    SEQUENCE NUMBER: 686227375
    ACKNOWLEDGEMENT NUMBER: 1639507565
    DATA OFFSET (32-BIT WORDS) : 5
    WINDOW: 8760
    CONTROL BITS: 24
    CHECKSUM: 0xDA31(VALID)
    URGENT POINTER: 0

DATA:
 0: 4A 4D 65 79 65 72 28 52 49 56 45 4E 44 45 4C 4C  | JMEYER(RIVENDELL
10: 5F 4E 54 29 3A 43 6F 60 60 61 6E 64 4C 69 6E 65  | _NT) COMMANDLINE
20: 3D 43 50 51 44 49 41 47 20 2D 73 20 66 6F 75     | =CPQDIAG -S -FOU
30: 74 70 75 74 2E 64 61 74 43 6F 6D 6D 61 6E 64 54  | TPUT.DATCOMMANDT
40: 69 6D 65 6F 75 74 3D 33 30                       | IMEOUT=30

FIG.6d ip: = = = = = = = = = = INTERNET PROTOCOL = = = = = = = = = = = =

STATION:172.18.216.111 ----> 172.18.216.121
PROTOCOL: TCP
VERSION: 4
HEADER LENGTH (32 BIT WORDS): 5
PRECEDENCE: ROUTINE
NORMAL DELAY, NORMAL THROUGHPUT, NORMAL RELIABILITY
TOTAL LENGTH: 69
IDENTIFICATION: 50053
FRAGMENTATION NOT ALLOWED, LAST FRAGMENT
FRAGMENT OFFSET: 0
TIME TO LIVE: 128 SECONDS
CHECKSUM: 0x2E1F(VALID)

tcp: = = = = = = = = = TRANSMISSION CONTROL PROTOCOL = = = = = = = = =

SOURCE PORT: 1251
DESTINATION PORT: 65213
SEQUENCE NUMBER: 686227448
ACKNOWLEDGEMENT NUMBER: 1639507588
DATA OFFSET (32-BIT WORDS) : 5
WINDOW: 8737
CONTROL BITS: 24
CHECKSUM: 0x38E4(VALID)
URGENT POINTER: 0

DATA:
0: 4A 4D 65 79 65 72 28 52 49 56 45 4E 44 45 4C 4C  JMEYER(RIVENDELL
10: 5F 4E 54 29 3A 52 65 73 75 6C 74 73 3D           _NT) RESULTS=

FIG.6e ip: = = = = = = = = = = INTERNET PROTOCOL = = = = = = = = = = = =

STATION:172.18.216.111 ----> 172.18.216.121
PROTOCOL: TCP
VERSION: 4
HEADER LENGTH (32 BIT WORDS): 5
PRECEDENCE: ROUTINE
NORMAL DELAY, NORMAL THROUGHPUT, NORMAL RELIABILITY
TOTAL LENGTH: 69
IDENTIFICATION: 50053
FRAGMENTATION NOT ALLOWED, LAST FRAGMENT
FRAGMENT OFFSET: 0
TIME TO LIVE: 128 SECONDS
CHECKSUM: 0x2E1F(VALID)

tcp: = = = = = = = = = TRANSMISSION CONTROL PROTOCOL = = = = = = = = =

SOURCE PORT: 1251
DESTINATION PORT: 65213
SEQUENCE NUMBER: 686227448
ACKNOWLEDGEMENT NUMBER: 1639507588
DATA OFFSET (32-BIT WORDS) : 5
WINDOW: 8737
CONTROL BITS: 24
CHECKSUM: 0x38E4(VALID)
URGENT POINTER: 0

DATA:
0: 4A 4D 65 79 65 72 28 52 49 56 45 4E 44 45 4C 4C  JMEYER(RIVENDELL
10: 5F 4E 54 29 3A 52 65 73 75 6C 74 73 3D           _NT) RESULTS=

FIG.6f ip: ==================INTERNET PROTOCOL==================
STATION:172.18.216.121 ----> 172.18.216.111
PROTOCOL: TCP
VERSION: 4
HEADER LENGTH (32 BIT WORDS): 5
PRECEDENCE: ROUTINE
NORMAL DELAY, NORMAL THROUGHPUT, NORMAL RELIABILITY
TOTAL LENGTH: 1500
IDENTIFICATION: 39881
FRAGMENTATION NOT ALLOWED, LAST FRAGMENT
FRAGMENT OFFSET: 0
TIME TO LIVE: 32 SECONDS
CHECKSUM: 0xB044(VALID)

tcp: =============TRANSMISSION CONTROL PROTOCOL=============
SOURCE PORT: 65213
DESTINATION PORT: 1251
SEQUENCE NUMBER: 1639507588
ACKNOWLEDGEMENT NUMBER: 686227477
DATA OFFSET (32-BIT WORDS): 5
WINDOW: 8658
CONTROL BITS: ACKNOWLEDGEMENT FIELD IS VALID (ACK)
CHECKSUM: 0x2ABF(VALID)
URGENT POINTER: 0

DATA:
```
 0: 4A 4D 65 79 65 72 28 54 45 53 54 53 54 41 54 49  JMEYER(TESTSTATI
10: 4F 4E 29 3A 41 63 6B 52 65 73 75 6C 74 73 3D 43  ON)ACKRESULTS=C
20: 6F 6D 70 61 71 20 44 69 61 67 6E 6F 73 74 69 63  OMPAQ DIAGNOSTIC
30: 73 20 66 6F 72 20 57 69 6E 64 6F 77 73 20 32 2E  S FOR WINDOWS 2.
40: 30 30 20 28 42 45 54 41 20 30 2E 30 31 29 0D 0A  00 (BETA 0.01)..
```

FIG.6g

METHOD AND APPARATUS FOR EXPORTING DIAGNOSTICS INTERFACE AND MENU SYSTEM TO ALLOW REMOTE EXECUTION

BACKGROUND OF THE INVENTION

1. Field of The Invention

This invention relates generally to remote computer accessing, and, more particularly, to exporting diagnostics interface and menu system to allow remote execution.

2. Description of the Related Art

Performing computer diagnostics and computer management are essential tasks for maintaining proper operation of computers. Modem computers have multiple complex hardware components that cooperate to perform computer operations. Integration of complex hardware and software in computers can result in several technical problems that compromise optimal performance of computers. Many times, a computer professional's services are required to remedy computer diagnostic problems.

Many of the consultations performed by computer experts are conducted via the telephone. Often, a computer user will communicate with a computer consultant over a telephone and run certain computer software and report back to the computer consultant. This can be a tedious process and an inefficient one. Many times, the computer operator will not be familiar with the software and hardware details to properly advise the computer consultant of the problem at hand. The computer consultant is then forced to iteratively narrow down possible hardware or software problems. This can be very time consuming and expensive. Furthermore, the computer that is in need of professional attention can become inactive until a computer technician is able to examine it. This delay can be very costly in terms of monetary and other costs.

Currently, there have been some attempts at performing remote computer management. These attempts have been primarily a method of computer communications using modems over typical telephone lines. This method is generally very slow and inefficient. Transmitting large amounts of data and graphical user interfaces over modems, and examining them in real time, can be a tedious process. Receiving status data from a remote computer over a modem communication line, and incorporating the status data into a graphical user interface is very difficult. Furthermore, performing remote testing on remote computers over modem communication lines can be very difficult. Many of the diagnostic communication operations become very difficult to perform effectively using modem style communications.

The present invention is directed to overcoming, or at least reducing the effects of, one or more of the problems set forth above.

SUMMARY OF THE INVENTION

In one aspect of the present invention, a method is provided for performing remote execution of system administration upon a standalone computer system, using a controlling computer system. A remote communication sequence is initiated. Communications between the controlling computer system and the standalone computer system is established using the remote communication sequence. Furthermore, a diagnostic software application is initiated on the standalone computer system using the established communication between the controlling computer system and the standalone computer system.

In another aspect of the present invention, an apparatus is provided for performing remote execution of system administration upon a standalone computer system, using a controlling computer system. The apparatus of the invention comprises: means for initiating a remote communication sequence; means for establishing communications between the controlling computer system and the standalone computer system using the remote communication sequence; and means for initiating a diagnostic software application on the standalone computer system using the established communication between the controlling computer system and the standalone computer system.

BRIEF DESCRIPTION OF THE DRAWINGS

The invention may be understood by reference to the following description taken in conjunction with the accompanying drawings, in which like reference numerals identify like elements, and in which:

FIGS. 6a–6g illustrate one embodiment of a TCP/IP socket communication packet flow for the present invention;

Figure 1A:
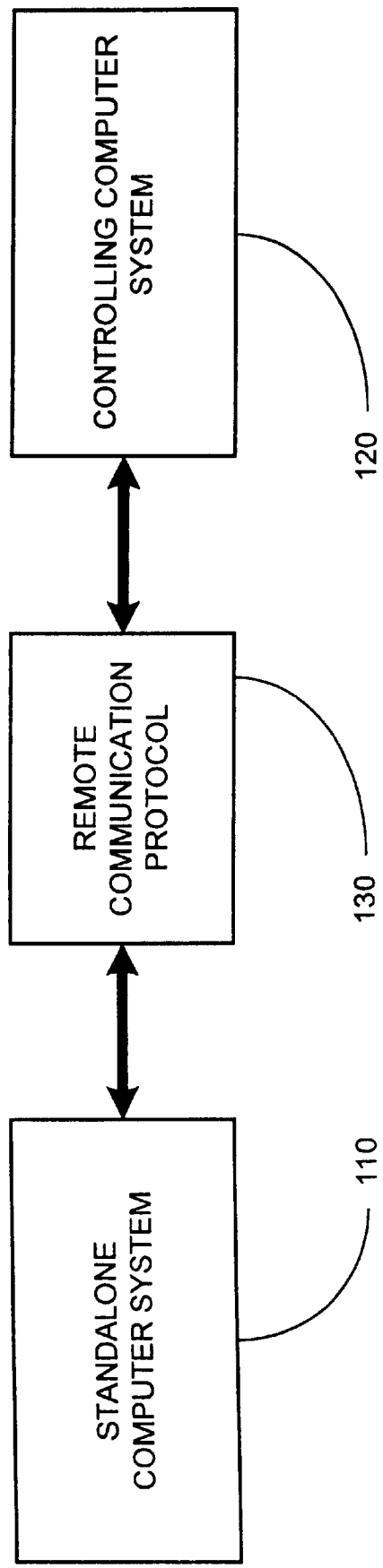
FIG. 1a is an illustration of one embodiment of the apparatus that facilitates the implementation of the present invention: a block diagram of a controlling computer system communicating with a standalone computer system using a remote communication protocol.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Turning now to FIG. 1a, one embodiment of a system that employs the present invention is illustrated. A standalone computer system 110 is electronically connected to a controlling computer system 120 through a remote communication protocol 130. The standalone computer system 110, in one embodiment, is a client computer system that is operational at a remote site, such as an office or a home. In one embodiment, the controlling computer system 120 is a computer controlled by a computer technician. Generally, the controlling computer system 120 is located at a remote office (not shown). In one embodi-ment ment, the standalone computer system 110 and the controlling computer system 120 may be comprised of a Macintosh system, a UNIX system, a PC system, a VAX system, a Workstation system, or any other system employed by those skilled in the art.

The remote communication protocol 130, in one embodiment, consists of a communication system that allows the controlling computer system 120 to perform system administration tasks upon the standalone computer system 110. One embodiment of the remote communications protocol 130 is illustrated in FIG. 2.

Figure 1B:
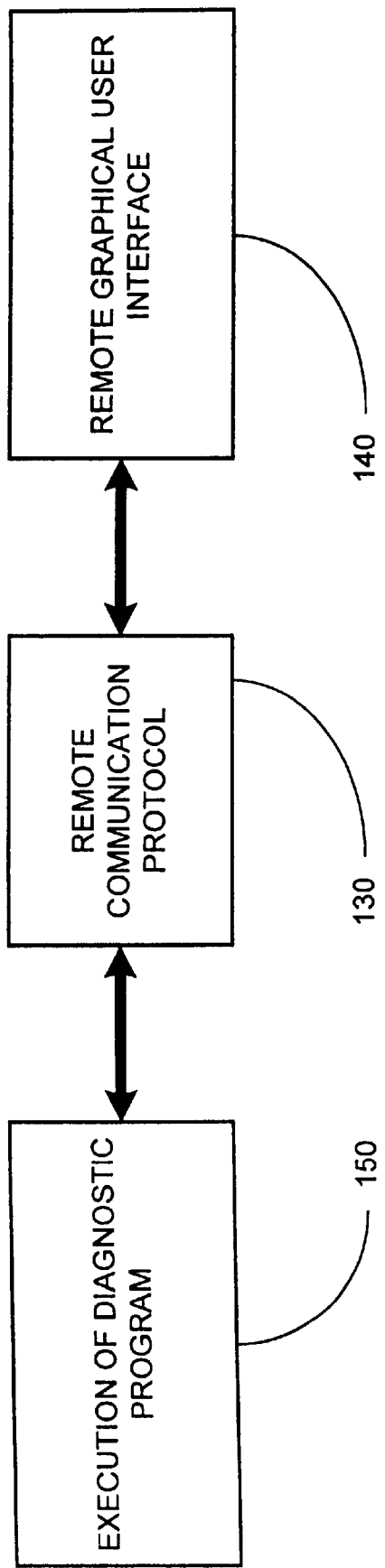
FIG. 1b is an illustration of one embodiment of the logical operation of a system that employs the present invention.

Turning now to FIG. 1b, a depiction of one embodiment of the logical operation of a system that employs the present invention is illustrated. A remote graphical user interface 140, which is associated with the controlling computer system 120, is used by the controlling computer system 120 to communicate with the standalone computer system 110. The controlling computer system 120 uses the remote graphical user interface 140 to perform the execution of the diagnostic program 150 in the standalone computer system 110. The remote graphical user interface 140 performs the execution of the diagnostic program 150 via the remote communication protocol 160. The remote graphical user interface 140 that is employed in the present invention is one of many graphical interfaces that are known by those skilled in the art who have the benefit of the present invention.

An operator of the controlling computer 120 can use the remote graphical user interface 140 to perform computer diagnostics, such as processor tests, and computer administration, such as peripheral device audits, upon the standalone computer system 110. In one embodiment, the remote graphical user interface 140 is capable of displaying a user interface screen that allows an operator of the controlling computer system 120 to perform computer diagnostics on the standalone computer system 110. The user interface screen displayed on the monitor associated with the controlling computer system 120 is substantially similar to the user interface screen that would be displayed if the operator were performing computer diagnostics directly on the standalone computer system 110.

Figure 2:
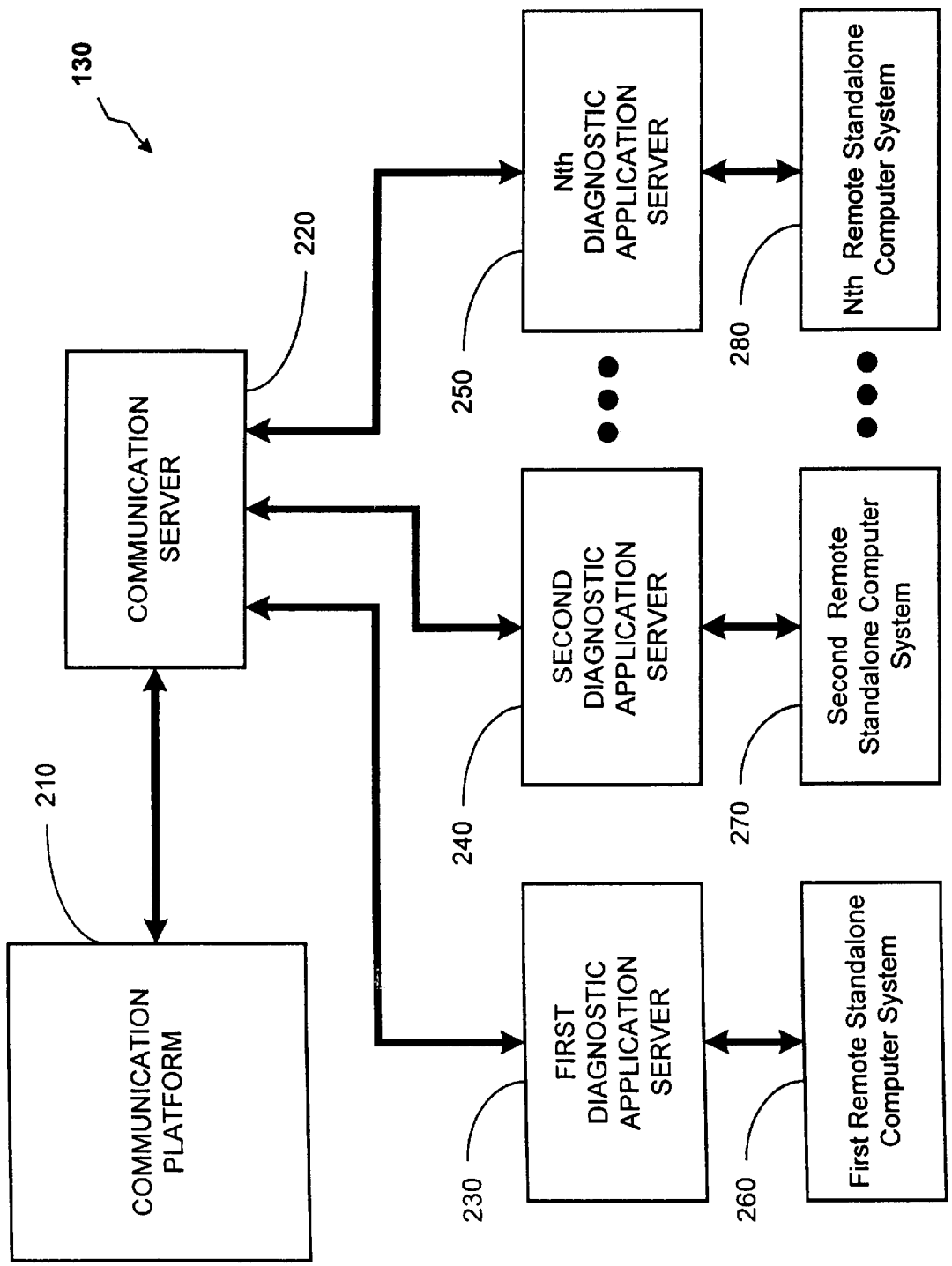
FIG. 2 illustrates one embodiment of the remote communications protocol described in FIG. 1.

Turning now to FIG. 2, a more detailed depiction of the remote communication protocol 130 is illustrated. A communication platform 210, which may be located in the controlling computer system 120, is electronically connected to a communication server 220.

The communication server 220 facilitates data transfer between the standalone computer system 110 and the controlling computer system 120. The communication server 220 is electronically connected to a first through an $n^{th}$ diagnostic application server 230, 240, 250.

In one embodiment, the first through $n^{th}$ diagnostic application servers 230, 240, 250 are electronically connected to a first through nth remote standalone computer system 260, 270, 280. The diagnostic application servers 230, 240, 250 facilitate system administration tasks, which are performed by the controlling computer system 120, upon the first through $n^{th}$ remote standalone computer systems 260, 270, 280.

In one embodiment, communications between the controlling computer system 120 and the first through nth remote standalone computer system 260, 270, 280 are facilitated by a Winsocket® interface system (not shown). Furthermore, in one embodiment, a universal electronic broadcast system (not shown), such as Multicast®, is used to address one or more standalone computer systems 110. Utilizing the Winsocket® system and the Multicast® system, the controlling computer system 130 is able to interface with multiple standalone computes (first through Nth remote standalone 260, 270, 280).

Generally, a broadcast using the Multicast® system is sent via the remote communication protocol. A message that inquires about the existence of at least one remote standalone computer 260, 270, 280 is generally sent out. Utilizing the remote communications protocol 130 described in the present invention, the remote standalone computers 260, 270, 280 can acknowledge their existence and their ability to communicate with the controlling computer system 120. In one example, the standalone computer system 120 will perform an overview status check on the remote standalone computers 260, 270, 280. Such a status will yield information such as remote standalone computer's processor type, the total memory in the remote standalone computer 280, peripheral devices that are interfaced with the remote standalone computer 280, etc. The controlling computer system 120 will be able to display a screen that is substantially similar to the screen that would be displayed if a local diagnostic program were to be executed locally on the remote standalone computers 260, 270, 280.

Utilizing the remote communication protocol 130, the controlling computer system 120 can display screens that list the status of the subsystems of the remote standalone computers 260, 270, 280, such as the status of input devices. These input devices include the keyboard, joystick, mouse, etc. Therefore, if a problem regarding any of the aforementioned subsystems is suspected, an operator using the controlling computer system 120 will be able to address the problem by accessing the status of the subsystems and narrow down the list of possible causes of the problem. Furthermore, utilizing the remote communication protocol 130, an operator can test the internal memory of the remote standalone computers 260, 270, 280 by accessing their respective memory sections and testing them.

In one embodiment, one test performed on the internal memory of the remote standalone computers 260, 270, 280 includes performing a write and read back test. The write and read-back test includes writing certain values into the internal memory locations of the remote standalone computers 260, 270, 280, and then reading the values back to insure that memory locations are functioning properly. Other remote diagnostic tests can be performed on the remote standalone computers 260, 270, 280 by utilizing the remote communication protocol 130 described in the present invention.

Figure 3:
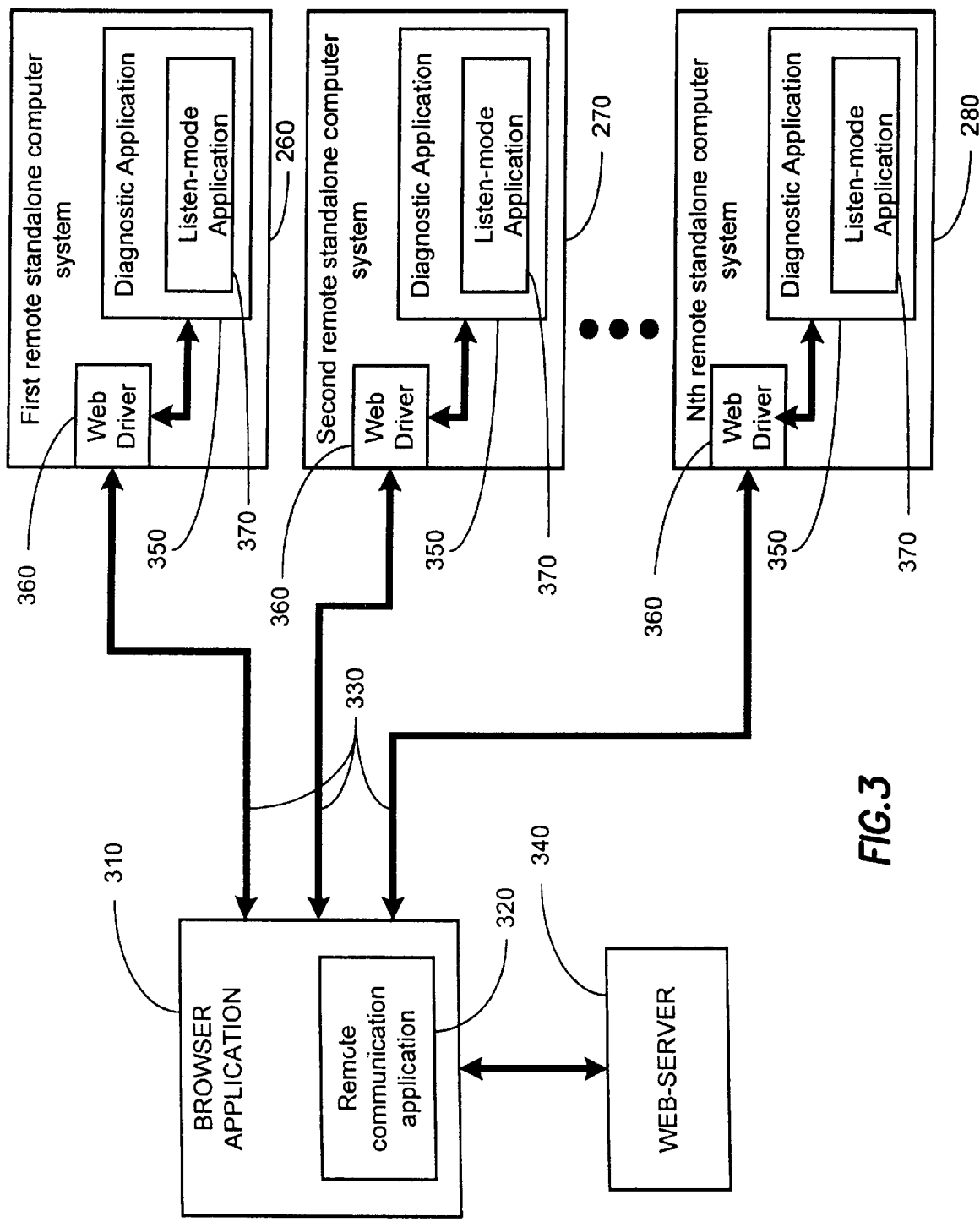
FIG. 3 illustrates a more detailed depiction of the communication system described in FIG. 2.

Turning now to FIG. 3, a more detailed depiction of the communication system described in FIG. 2 is illustrated. The communication system depicted in FIG. 3 is a Internet/Intranet communication system that facilitates communications between the control-ling omputer system 120 and the first through Nth remote standalone communication systems 260, 270, 280. In one embodiment, the communication platform 210 described in FIG. 2 includes a browser application 310, in which a remote communication application 320 is embedded. In one embodiment, the browser application 310 may include Microsoft Explorer®, Netscape®, or other such applications that are known by those skilled in the art. The browser application 310, which in one embodiment is located within the controlling computer system 120, is capable of facilitating communications between the controlling computer system 120 and the first through Nth remote standalone computer systems 260, 270, 280. In one embodiment, communications between the controlling computer system 120 and the remote standalone computer systems 260, 270, 280 is conducted via an internet/intranet path 330.

In one embodiment, the browser application 310 will interact with a web server 330 that is connected to the Internet/Intranet path 330. The interaction between the browser application 310 and a web server 340 initiates the launch of a remote communication application 320 that facilitates remote computer communications. Upon launch of the remote communication application 320, control files are downloaded from the remote communication application platform 320 to a first through an $n^{th}$ remote standalone computer 260, 270, 280. Each of the remote standalone computers 260, 270, 280 contains a diagnostic application 350 that can be accessed and controlled by the controlling computer system 120 via the remote communication protocol 130. Communications from the remote communication application 320 to the first through nth remote standalone computers 260, 270, 280 are received by the web drivers 370.

The first through Nth remote standalone computers 260, 270, 280 contain a diagnostic application 350 that is accessible through the web driver 360. The web driver 360 facilitates data transfer between the browser application 310 and the first through nth remote standalone computers 260, 270, 280. The remote communication application 320, in conjunction with the browser application 310 and the web server 340, initiates and controls the diagnostic applications 350 via the Internet/Intranet path 330.

The controlling computer system 120, which in one embodiment contains the browser application 310, can gain access to the diagnostic applications 350 in the first through nth remote standalone computers 260, 270, 280, through the communication path described above. Utilizing the software and hardware computer communication system described above, the controlling computer system 120 can perform system administration on the first through nth remote standalone computers 260, 270, 280.

In one embodiment, the diagnostic application 350 in the remote standalone computer systems 260, 270, 280, contains a listen-mode application 370. The listen-mode application 370 is capable of monitoring signals that indicate a request for the initiation of the diagnostic application 350, from the controlling computer system 110. In one embodiment, the listenmode application 370 is an executable program that is associated with the diagnostic application 350. The listen-mode application 370 is launched when the operating system, such as Windows®, is initiated in the first through Nth remote standalone computer system 260, 270, 280.

Once launched, the listen-mode application 370 enters a waiting state, in which it monitors incoming requests for the initiation of the diagnostic application 350. When the listen-mode application 370 detects a request for initiation of the diagnostic application 350, the diagnostic application 350 is launched and the desired system administration is performed on the remote standalone computer systems 260, 270, 280. In one embodiment, the listenmode application 370 receives instructions from the standalone computer system 120, translates the received instructions, and sends the instructions to the diagnostic application 350. The diagnostic application 350 then responds appropriately to the instructions received. Once the desired system administration is completed, the diagnostic application 350 is closed and the listen-mode application 370 goes back into a waiting state, monitoring incoming request for diagnostic application 350 initiation.

Figure 4:
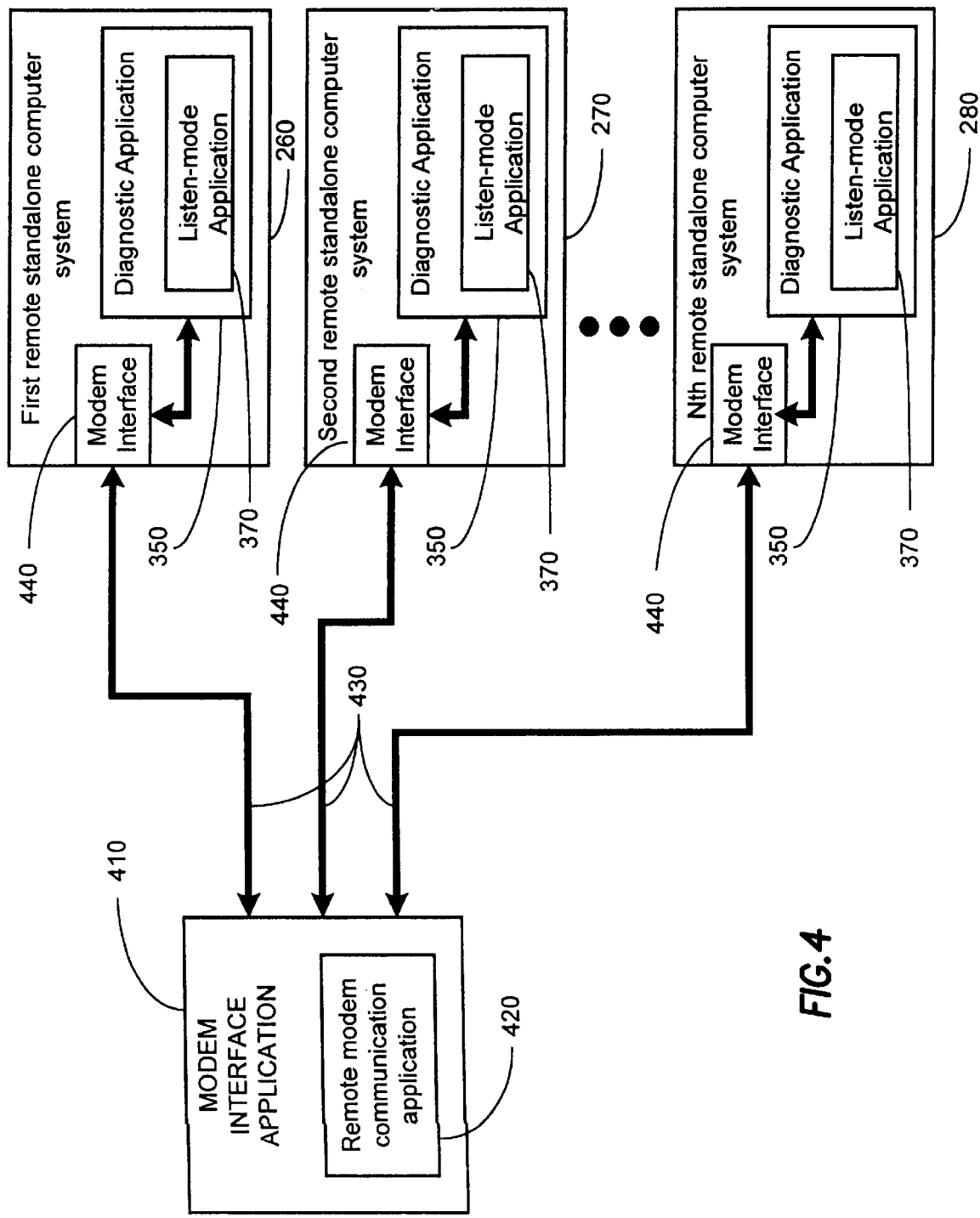
FIG. 4 illustrates an alternative embodiment of a detailed depiction of the communication system described in FIG. 2.

In an alternative embodiment, a modem-based communication between the controlling computer system 120 and the first through Nth standalone computer systems 260, 270, 280, is employed. Turning now to FIG. 4, an alternative embodiment of a detailed depiction of the communication system described in FIG. 2 is illustrated. The communication system depicted in FIG. 4 is a modem-based communication system that facilitates communications between the controlling computer system 120 and the first through Nth remote standalone communication systems 260, 270, 280. In one embodiment, the communication platform 210 described in FIG. 2 includes a modem interface application 410, in which a remote modem communication application 420 is embedded.

The modem interface application 410 may be comprised of one of a number of modem communication applications that are known by those skilled in the art. Associated with the modem interface application is the remote modem communication application 420, which in one embodiment is located in the controlling computer system 120. The remote communication application 420 is capable of facilitating communications between the controlling computer system 120 and the first through Nth remote standalone computer systems 260, 270, 280. In one embodiment, communications between the controlling computer system 120 and the remote standalone computer systems 260, 270, 280 is conducted via a modem communication path 430, which in one embodiment, includes a telephone line.

In one embodiment, the remote modem communication application 420 will interact with a modem interface 440 that is connected to the modem communication path 430. The interaction between the modem communication application 420 and modem interface 440 initiates the launch of a remote modem communication application 420 that facilitates remote computer communications. Upon launch of the remote modem communication application 420, control files are downloaded from the remote modem communication application platform 420 to a first through an $n^{th}$ remote standalone computer 260, 270, 280. Each of the remote standalone computers 260, 270, 280 contains a diagnostic application 380 that can be accessed and controlled by the controlling computer system 120 via the remote communication protocol 130. Communications from the remote modem communication application 420 to the first through nth remote standalone computers 260, 270, 280 are received by the modem interface 440.

The first through nth remote standalone computers 260, 270, 280 contain a diagnostic application 350 that is accessible through the web driver 360. The modem interface 440 facilitates data transfer between the modem communication application 420 and the first through nth remote standalone computers 260, 270, 280. The remote modem communication application 420, in conjunction with the modem communication application 420, initiates and controls the diagnostic applications 350 via the modem communication path 430.

The controlling computer system 120, which in one embodiment contains the browser application 310, can gain access to the diagnostic applications 350 in the first through $n^{th}$ remote standalone computers 260, 270, 280, through the communication path described above. Utilizing the software and hardware computer communication system described above, the controlling computer system 120 can perform system administration on the first through nth remote standalone computers 260, 270, 280.

Figure 5:
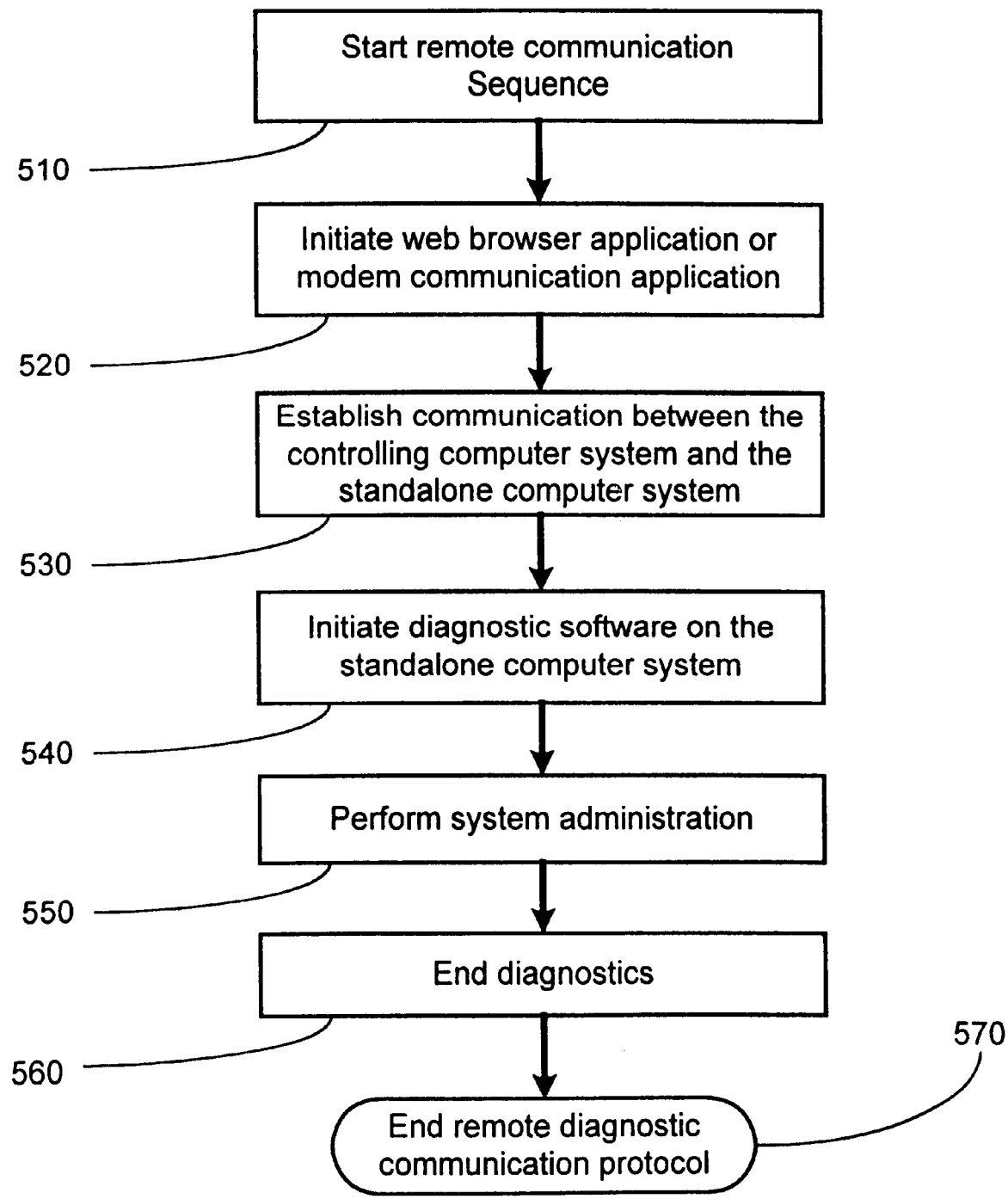
FIG. 5 illustrates a block diagram of the method of system administration by the controlling computer described in FIG. 1.

A block diagram of the method of system administration by a controlling computer system 120 is illustrated in FIG. 5. Turning now to FIG. 5, the remote system administration described by the present invention is initiated by starting a remote communication sequence, as described in block 510.

In one embodiment, the communication sequence is implemented by the communication platform 210 and the communication server 220, which incorporates the browser application 310 and the remote communication application 320, as described in FIG. 3. In an alternative embodiment, the communication sequence is implemented by the communication platform 210 and the communication server 220, which incorporates the modem interface application 410 and the remote modem communication application 420.

In one embodiment, the browser application 310 is initiated within the context of the remote communication application 320, as described in block 520 of FIG. 5. In an alternative embodiment, the modem interface application 410 is initiated within the context of the remote modem communication application 420, as also described in block 520 of FIG. 5. In one embodiment, the remote communication application 320 contains object-oriented programs that are inserted into a web page. In an alternative embodiment, the remote modem communication application 420 contains objected-oriented programs that are executed through modem communications. The communication sequence described in block 510 is further implemented by integrating the remote communication application 320 or the remote modem communication application 420, with a Microsoft Windows Sockets Application Programming Interface (API) (not shown). The Microsoft Windows API is well known by those skilled in the art. The specifications of Windows Sockets®, known by those skilled in the art, are used to integrate the use of the API and the Internet Protocol Suite, generally referred to as TCP/IP, which is known to those skilled in the art. One embodiment of the TCP/IP socket communication packet flow is illustrated in FIG. 6a through FIG. 6g.

As described in block 530 of FIG. 5, communications with the controlling computer system 120 and the standalone computer system 110 is established using the remote communication protocol 130 described in the present invention. The diagnostic application 350, such as Compaq Diagnostics®, is initiated on the standalone computer system 110, as described in block 540 of FIG. 5. The remote graphical user interface 140 is used to control the execution of the diagnostic application 350 in the first through Nth remote standalone computer systems 260, 270, 280.

Utilizing the communication systems described above, the controlling computer system 120 performs system administration tasks on the standalone computer system 110, as described in block 550 of FIG. 5. The system administration tasks performed on the standalone computer system include inspection of the hardware and software, status checks, hardware tests, and asset management.

Figure 7:
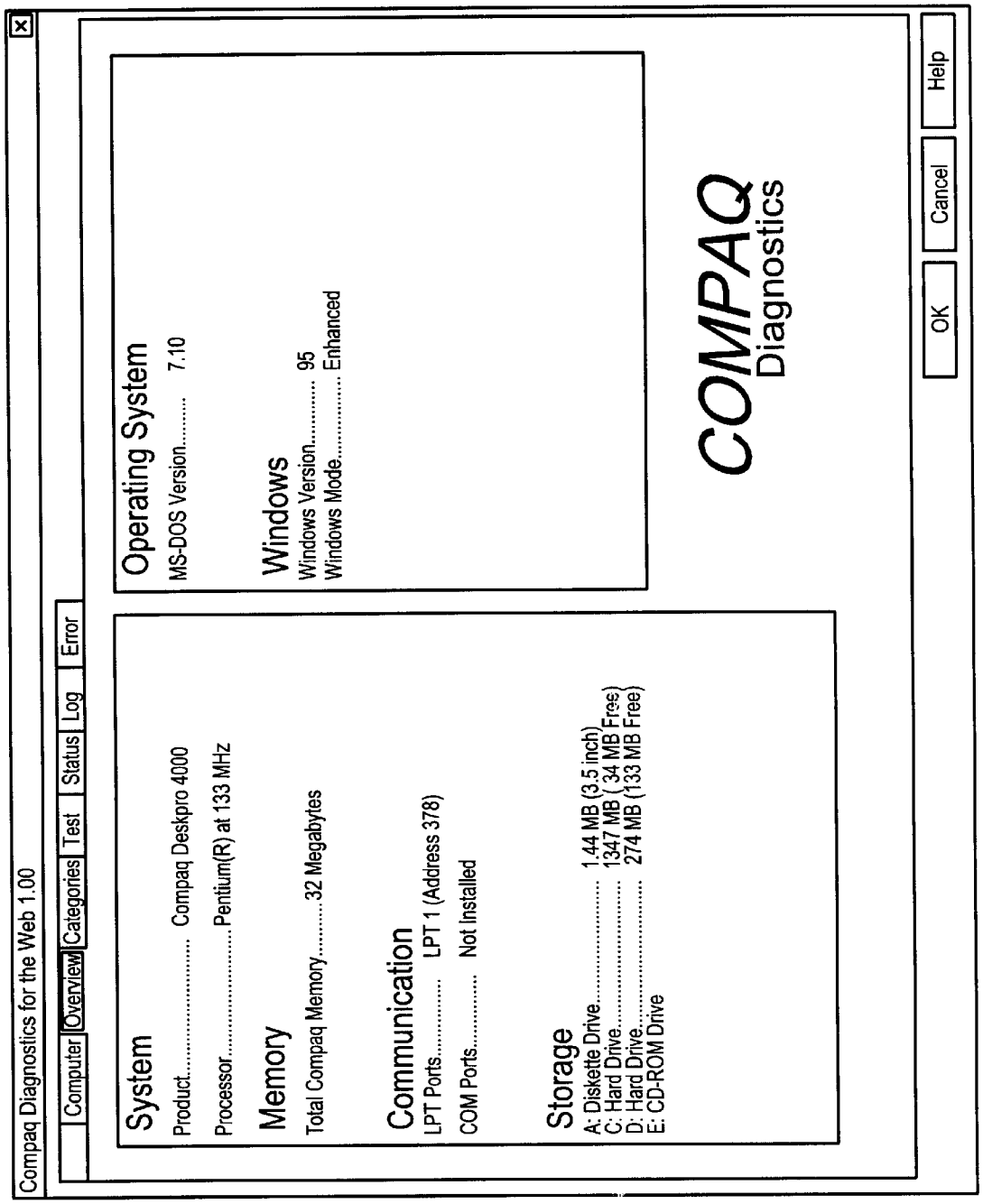
FIG. 7 illustrates one example of the inspection of the hardware and software in a standalone computer, performed by Compaq Diagnostic® and reported over the Internet, as implemented by the present invention.
Figure 8:
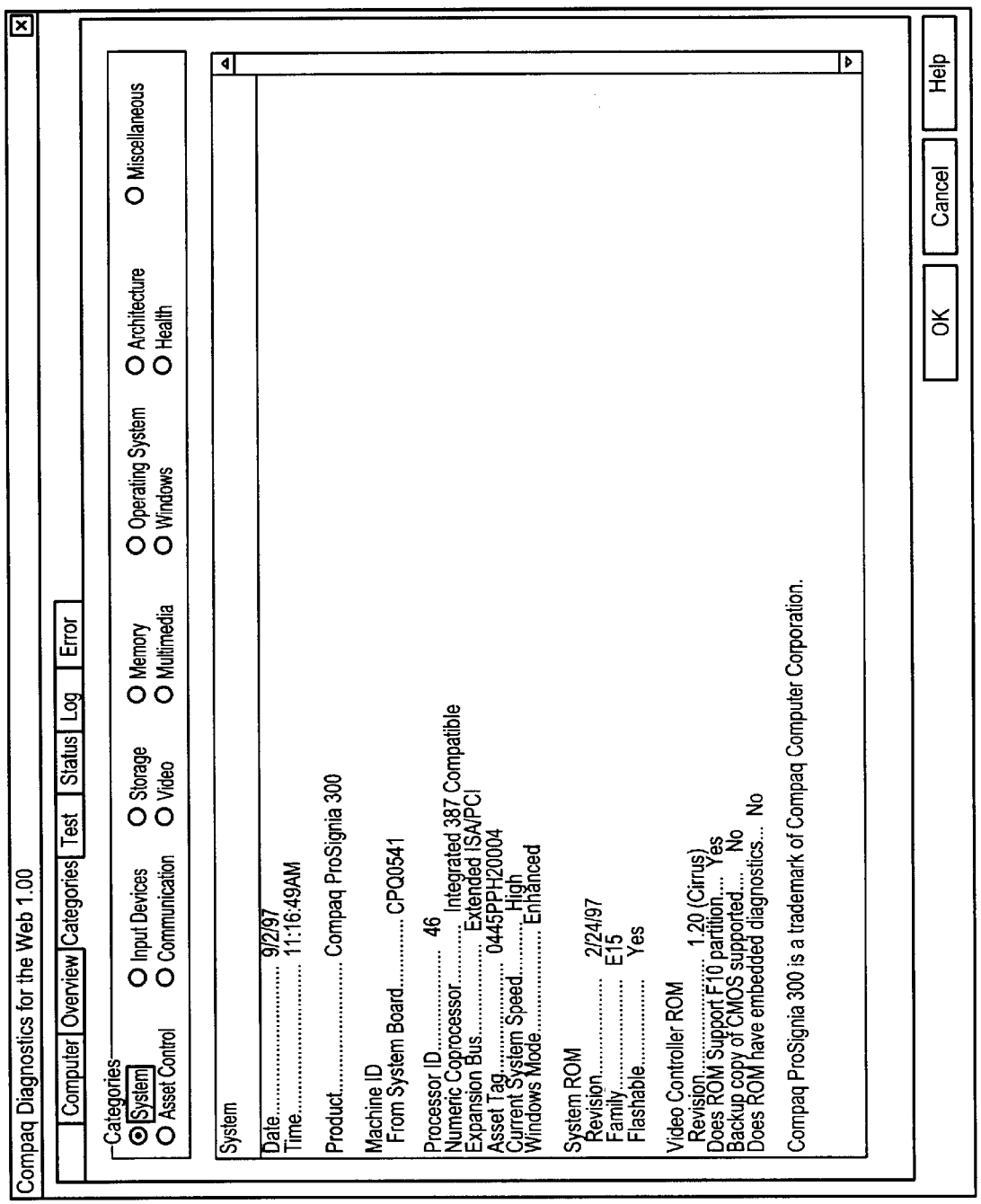
FIG. 8 illustrates one example of the status check of a standalone computer, performed by Compaq Diagnostic® and reported over the Internet, as implemented by the present invention.

One example of inspection of the hardware and software in a standalone computer 110, performed by Compaq Diagnostic® and reported over the Internet/Intranet path 330 or modem communication path 430, is illustrated in FIG. 7. As illustrated in FIG. 7, the computer system-type, the processor type, the storage device type, the software version and detected remotely, using the principles of the present invention. Computer status, such as the expansion bus and the current computer system speed, can be obtained by using the principles described in the present invention. One example of the status check of a standalone computer 110, performed by Compaq Diagnostic® and reported over the Internet, is illustrated in FIG. 8.

Figure 9:
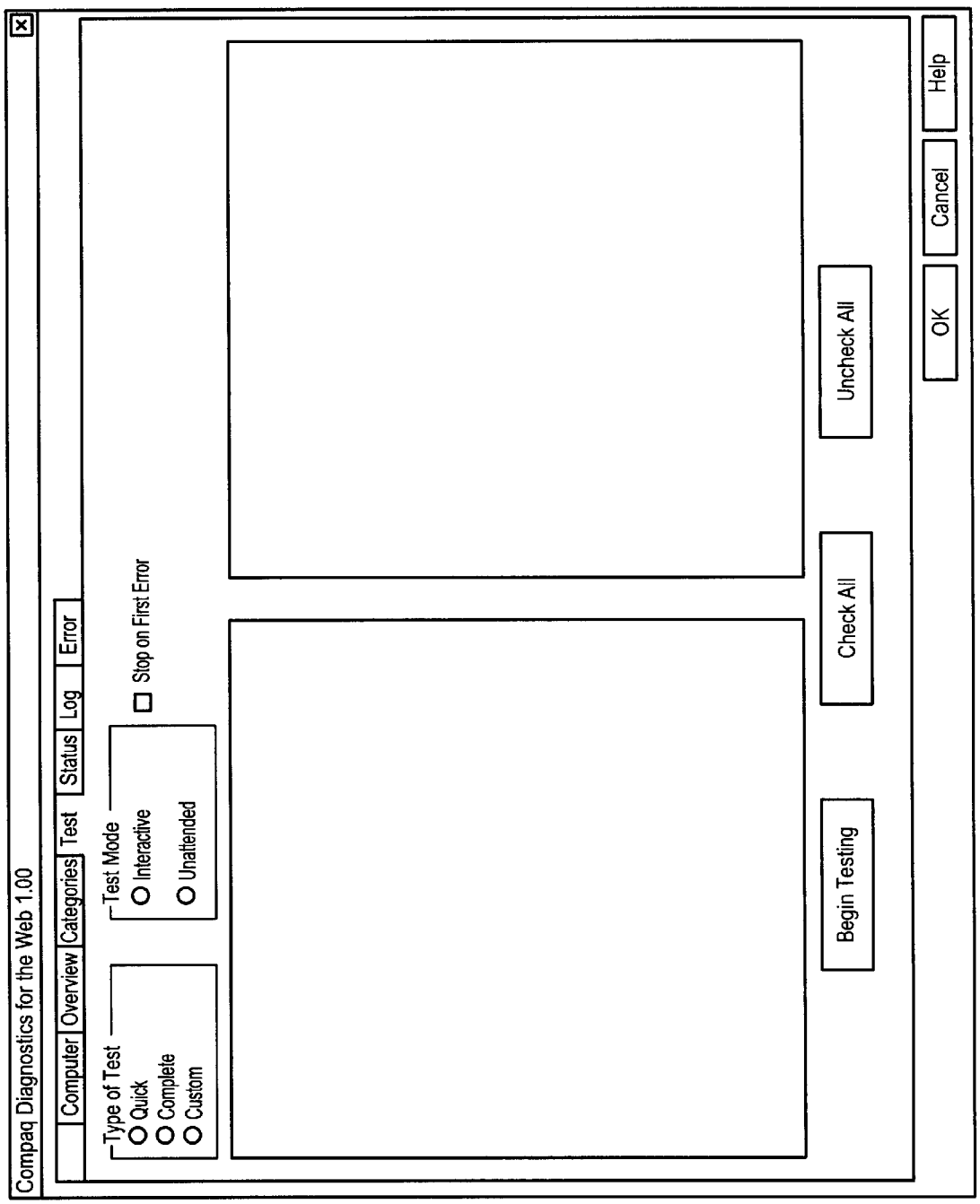
FIG. 9 illustrates one example of a screen display, in Compaq Diagnostic® software, that allows a user to perform remote testing of a standalone computer system, as implemented by the present invention.

Many types of hardware and software tests can be performed upon a standalone computer 110 using the principles taught by the present invention. One example of a hardware test is to write to a certain register in the main Central Processing Unit (CPU), and read back the value in that particular register. If the data that was written in the CPU register is read back, then the write/read test can be deemed successful. Other hardware tests, such as testing of computer peripherals, can be performed using the present invention. One example of a screen display, in the Compaq Diagnostic® software, that allows a user to perform remote testing of a standalone computer system 110, is illustrated in FIG. 9.

Other system administration tasks, such as asset management of computer peripherals, can be performed by implementing the present invention. Audit trails of peripherals in standalone computer systems 110, such as computer systems within a corporate office, can be performed to ensure that computer peripherals are not changed or displaced without authorization.

Other system administration tasks can be performed by the implementing the principles taught by the present invention.

Once the desired system administration is performed on the standalone computer system 110, the remote diagnostic communication protocol is terminated, as described in block 560 of FIG. 5. The remote diagnostic communication sequence is then terminated, as described in block 570 of FIG. 5. At this point, control of the standalone computer 110 is relinquished by the controlling computer system 120. The principles taught by the present invention may be utilized by one skilled in art and having the benefit of the present disclosure, to perform various computer-related tasks from a remote location.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method for performing remote execution of system administration upon a standalone computer system, using a controlling system, comprising:

initiating a remote communication sequence;

establishing communications between said controlling computer system and said standalone computer system using said remote communication sequence;

submitting a request to said standalone computer system to perform a status check;

receiving status information from said standalone computer system in response to said status check; and in response to said status information, initiating a diagnostic software application on said standalone computer system using said established communication between said controlling computer system and said standalone computer system.

2. The method as described in claim 1, wherein starting a remote communication sequence further comprises initiating a browser application using a communication server.

3. The method as described in claim 2, wherein initiating a browser application using a communication server further comprises initiating a remote communication application.

4. The method as described in claim 2, wherein using a communication server further comprises using a web server.

5. The method as described in claim 1, wherein starting a remote communication sequence further comprises initiating a modem interface application.

6. The method as described in claim 5, wherein initiating a modem interface application further comprises initiating a remote modem communication application.

7. The method as described in claim 1, wherein establishing communications between said controlling computer system and said standalone computer system further comprises using said remote communication sequence to initiate a browser application within a communication control platform of said controlling computer system.

8. The method as described in claim 1, wherein establishing communications between said controlling computer system and said standalone computer system further comprises establishing a TCP/IP communication link.

9. The method as described in claim 1, wherein initiating a diagnostic software on said standalone computer system using said established communication between said controlling computer system and said standalone computer system further comprises initiating a diagnostic program on said standalone computer system through an internet/intranet path.

10. The method as described in claim 1, wherein initiating a diagnostic software on said standalone computer system using said established communication between said controlling computer system and said standalone computer system further comprises initiating a diagnostic program on said standalone computer system through an modem communication path.

11. The method as described in claim 1, wherein initiating a diagnostic software on said standalone computer system using said established communication between said controlling computer system and said standalone computer system further comprises said controlling computer system performing computer diagnostic operations on said standalone computer system using said established communication between said controlling system and said standalone computer.

12. The method as described in claim 11, wherein performing computer diagnostic operations on said standalone computer system further comprises performing status checks on said standalone computer system.

13. The method as described in claim 11, wherein performing computer diagnostic operations on said standalone computer system further comprises performing system inspection on said standalone computer system.

14. The method as described in claim 11, wherein performing computer diagnostic operations on said standalone computer system further comprises performing tests on said standalone computer system.

15. The method as described in claim 14, wherein performing tests on said standalone computer system further comprises performing tests on a central processing unit (CPU) of said standalone computer system.

16. The method as described in claim 14, wherein performing tests on said standalone computer system further comprises performing tests on subsystems of said standalone computer system.

17. The method as described in claim 1, wherein initiating a diagnostic software on said standalone computer system using said established communication between said controlling computer system and said standalone computer system further comprises said controlling computer system performing computer asset management functions on said standalone computer system using said established communication between said controlling system and said standalone computer.

18. An apparatus for performing remote execution of system administration upon a standalone computer system, using a controlling computer system, comprising:

means for initiating a remote communication sequence;

means for establishing communications between said controlling computer system and said standalone computer system using said remote communication sequence;

means for submitting a request to said standalone computer system to perform a status check;

means for receiving status information from said standalone computer system in response to said status check; and means for initiating a diagnostic software application on said standalone computer system, in response to said status information, using said established communication between said controlling computer system and said standalone computer system.

19. A computer readable program storage device encoded with instructions that, when executed by a computer, performs a method for performing remote execution of system administration upon a standalone computer system, using a controlling computer system, comprising:

initiating a remote communication sequence;

establishing communications between said controlling computer system and said standalone computer system using said remote communication sequence;

submitting a request to said standalone computer system to perform a status check;

receiving status information from said standalone computer system in response to said status check; and initiating a diagnostic software application on said standalone computer system using said established communication between said controlling computer system and said standalone computer system.

20. The computer readable program storage device encoded with instructions that, when executed by a computer, performs the method as described in claim 19, wherein starting a remote communication sequence further comprises initiating a browser application using a communication server.

21. The computer readable program storage device encoded with instructions that, when executed by a computer, performs the method as described in claim 20, wherein initiating a browser application using a communication server further comprises initiating a remote communication application.

22. The computer readable program storage device encoded with instructions that, when executed by a computer, performs the method as described in claim 20, wherein using a communication server further comprises using a web server.

23. The computer readable program storage device encoded with instructions that, when executed by a computer, performs the method as described in claim 19, wherein starting a remote communication sequence further comprises initiating a modem interface application.

24. The computer readable program storage device encoded with instructions that, when executed by a computer, performs the method as described in claim 19, wherein initiating a modem interface application further comprises initiating a remote modem communication application.

25. The computer readable program storage device encoded with instructions that, when executed by a computer, performs the method as described in claim 19, wherein establishing communications between said controlling computer system and said standalone computer system further comprises using said remote communication sequence to initiate a browser application within a communication control platform of said controlling computer system.

26. The computer readable program storage device encoded with instructions that, when executed by a computer, performs the method as described in claim 19, wherein establishing communications between said controlling computer system and said standalone computer system further comprises establishing a TCP/IP communication link.

27. The computer readable program storage device encoded with instructions that, when executed by a computer, performs the method as described in claim 19, wherein initiating a diagnostic software on said standalone computer system using said established communication between said controlling computer system and said standalone computer system further comprises initiating a diagnostic program on said standalone computer system through an intemet/intranet path.

28. The computer readable program storage device encoded with instructions that, when executed by a computer, performs the method as described in claim 19, wherein ' initiating a diagnostic software on said standalone computer system using said established communication between said controlling computer system and said standalone computer system further comprises initiating a diagnostic program on said standalone computer system through an modem communication path.

29. The computer readable program storage device encoded with instructions that, when executed by a computer, performs the method as described in claim 19, wherein initiating a diagnostic software on said standalone computer system using said established communication between said controlling computer system and said standalone computer system further comprises said controlling computer system performing computer diagnostic operations on said standalone computer system using said established communication between said controlling system and said standalone computer.

30. The computer readable program storage device encoded with instructions that, when executed by a computer, performs the method as described in claim 29, wherein performing computer diagnostic operations on said standalone computer system further comprises performing status checks on said standalone computer system.

31. The computer readable program storage device encoded with instructions that, when executed by a computer, performs the method as described in claim 29, wherein performing computer diagnostic operations on said standalone computer system further comprises performing system inspection on said standalone computer system.

32. The computer readable program storage device encoded with instructions that, when executed by a computer, performs the method as described in claim 29, wherein performing computer diagnostic operations on said standalone computer system further comprises performing tests on said standalone computer system.

33. The computer readable program storage device encoded with instructions that, when executed by a computer, performs the method as described in claim 32, wherein performing tests on said standalone computer system further comprises performing tests on a central processing unit (CPU) of said standalone computer system.

34. The computer readable program storage device encoded with instructions that, when executed by a computer, performs the method as described in claim 32, wherein performing tests on said standalone computer system further comprises performing tests on subsystems of said standalone computer system.

35. The computer readable program storage device encoded with instructions that, when executed by a computer, performs the method as described in claim 19, wherein initiating a diagnostic software on said standalone computer system using said established communication between said controlling computer system and said standalone computer system further comprises said controlling computer system performing computer asset management functions on said standalone computer system using said established communication between said controlling system and said standalone computer.

36. A method for performing concurrent remote execution of system administration upon a plurality of computer systems, using a controlling system, comprising:

initiating a remote communication sequence to each of said plurality of computer systems;

establishing communications between said controlling computer system and said computer systems using said remote communication sequence;

broadcasting a request to said computer systems to perform a status check on each of said computer systems;

receiving status information from each of said computer systems in response to said status checks; and in response to said status information received from a computer system, initiating a diagnostic software application on said computer system using said established communication between said controlling computer system and said computer system.

37. A diagnostic system, comprising:

a remote communication application; and a network connection to a plurality of computer systems;

wherein said remote communication application broadcasts a request to each of said computer systems to perform a status check on each computer systems and receives status information generated by each computer system in response to said status checks, said remote communication application also transmits a signal to a computer system whose status information is indicative of anomalous computer system behavior, said signal causes said computer system to perform a test of at least one component comprising said computer system.

* * * * *